United States Patent
Walker (12)

(10) Patent No.: US 6,331,583 B1
(45) Date of Patent: Dec. 18, 2001

(54) ACID CATALYZED POLYMERIZATION OF AQUEOUS EPOXY RESIN EMULSIONS AND USES THEREOF

(75) Inventor: Frederick Herbert Walker, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/542,759

(22) Filed: Apr. 4, 2000

(51) Int. Cl.$^7$ .............................. C08K 3/20; C08L 63/02
(52) U.S. Cl. .......................... 523/404; 523/402; 524/800
(58) Field of Search ..................... 524/800, 819, 524/821, 823, 827, 832, 834, 836; 523/402, 403, 404

(56) References Cited

U.S. PATENT DOCUMENTS

| | | | |
|---|---|---|---|
| 2,872,427 | * 2/1959 | Schroeder ........................ | 513/403 |
| 3,305,565 | * 2/1967 | Mueller . | |
| 4,315,044 | 2/1982 | Elmore et al. .................... | 427/386 |
| 4,355,154 | 10/1982 | Saam et al. ...................... | 528/274 |
| 4,374,953 | 2/1983 | Chou et al. ...................... | 525/153 |
| 4,415,682 | 11/1983 | Becker ............................ | 523/403 |
| 4,540,740 | * 9/1985 | Olson et al. ..................... | 524/811 |
| 4,596,843 | * 6/1986 | Wind ............................... | 523/416 |
| 4,608,406 | 8/1986 | Williams, Jr. et al. ........... | 523/424 |
| 4,611,026 | * 9/1986 | Olson et al. ..................... | 524/548 |
| 5,766,768 | 6/1998 | Cummings et al. ............... | 428/418 |
| 5,908,902 | * 6/1999 | Pfeil et al. ....................... | 525/524 |
| 5,925,694 | * 7/1999 | Stengel-Ruthkowski et al. .. | 523/412 |

FOREIGN PATENT DOCUMENTS

| 2303857 | 5/1997 | (GB) . |
|---|---|---|

OTHER PUBLICATIONS

Satoh, K., et al., "Lanthanide Triflates–Mediated Emulsion Cationic Polymerization of p–Alkoxystyrenes in Aqueous Media", *Macromolecules 2000*, pp. 4660–4666: American Chemical Society, 2000.

Satoh, K., et al., "Cationic Emulsion Polymerization in Aqueous Media With Metal Triflates", *Polymer Preprints*, Japan (English Edition), vol. 47, Nos. 1–5:1998.

Satoh, K., et al. "Controlled Cationic Polymerization of P–Alkoxystyrene and P–Hydroxystyrene in Aqueous Media", *Polym. Prepr.*, 40(2), pp. 895–896: American Chemical Society, Div. Polym. Chem., 1999.

Satoh, K., et al., "Cationic Polymerization in Aqueous Media With Rare Earth Lewis Acid Catalysts", *Polymer Preprints*, Japan (English Edition), vol. 46, Nos. 6–14: 1997.

Satoh, K., et al., "Sulfonic Acids as Water–Soluble Initiators for Cationic Polymerization in Aqueous Media With Yb(OTf)$_3$", *Journal of Polymer Science*: Part A: Polymer Chemistry, vol. 38, pp. 2728–2733: John Wiley & Sons, Inc., 2000.

May, C. A. (Ed), *Epoxy Resins Chemistry and Technology*, Marcel Dekker, Inc.: New York, 1988, pp. 495–498.

Walker, F. H., et al, "Two–Component Waterbone Epoxy Coatings", *Technology for Waterborne Coatings*, American Chemical Society: Washington DC, 1997, pp. 71–93.

Hecheng Xiangjiao Gongye, 8(2), 100–4, 1985.

Hecheng Xiangjiao Gongye, 8(1), 15–18, 1985.

Gaofenzi Tongxun (2), 104–9, 1983.

Gaofenzi Tongxun (4), 310–13, 1982.

Gaofenzi Tongxun (4), 266–70, 1982.

Weyenberg, D. R., et al, "Anionic Emulsion Polymerization of Siloxanes", *Polymer Preprints, American Chem. Soc., Div. Polym. Chem.*, vol. 7(2), 1966, pp. 562–568.

\* cited by examiner

*Primary Examiner*—Robert Dawson
*Assistant Examiner*—D. Aylward
(74) *Attorney, Agent, or Firm*—Michael Leach

(57) ABSTRACT

Compositions of emulsified polymeric polyols, are prepared by a method comprising the acid catalyzed, non-reversible polymerization of lower molecular weight epoxy resins in an aqueous emulsified state. Coating compositions are prepared from the emulsified polymeric polyols crosslinked with various crosslinking agents.

36 Claims, No Drawings

ACID CATALYZED POLYMERIZATION OF AQUEOUS EPOXY RESIN EMULSIONS AND USES THEREOF

BACKGROUND OF THE INVENTION

Epoxy resins are commercially important materials that are used extensively to make thermosetting products for use in coatings, adhesives, composites, and many other applications. The largest volume of epoxy resins utilized in commerce are those based upon the diglycidyl ether of bisphenol-F (DGEBF), epoxy novolac resins, and those based upon the diglycidyl ether of bisphenol-A (DGEBA). Of these, the bisphenol-A based products are utilized in much larger volumes than the other products.

Despite the fact that epoxy resins can be crosslinked with amino resins and the like through the secondary hydroxyl groups on the resin backbone, it is generally found that significantly higher temperatures and/or bake times are required than are necessary with other polyols utilized in coatings, such as acrylic polyols and polyester polyols. It is thought the relatively hindered environment of the OH groups on the epoxy resin is responsible for this effect. Obviously, this is usually a significant drawback to the utilization of epoxy resins in such coatings, since higher oven temperatures and/or bake times lead to higher production costs.

Cationic or acid-catalyzed polymerization (or homopolymerization) of multifunctional epoxy resins in bulk or in organic solvent solution is a well-known process of significant commercial importance. Lewis acids are most commonly employed, but appropriate Bronsted acids can also be utilized. For example, C. A. May (Ed.), *Epoxy Resins Chemistry and Technology*, Marcel Dekker, Inc.: New York, 1988, reports (p. 495) that Lidarik et. al. (Polymer Sci. USSR, 1984, 5, 589) polymerized glycidyl ethers with complexes of antimony pentachloride, boron trifluoride, and perchloric acid. Additional examples are reported in May. In addition, the photoinitiated cationic polymerization of epoxy resins is well-known, and also of commercial importance. As reviewed in May (pp. 496–498), cationic photoinitiators are materials that upon photolysis generate strong Bronsted acids, which serve as the true catalyst for the epoxide polymerization.

The general structure of resins obtained by polymerization of multifunctional epoxides differs from the linear structure of a bisphenol-A resin. In the cationic polymerization process, an alcohol or water serves as an initiator for polymerization, which occurs by attack onto an activated (protonated or coordinated with a Lewis acid) epoxide. Note that the alcohol may be one of the hydroxyl groups already present on an epoxy resin backbone. The product that results is an alcohol, that can go on to react with another protonated epoxide. Note also that attack can occur at the unsubstituted carbon on the epoxide ring to yield the secondary alcohol, or on the substituted carbon to yield the primary alcohol. This is in contrast to the epoxy advancement process used to make higher molecular weight bisphenol-A resins, which is conducted under conditions where the secondary alcohol is formed almost exclusively.

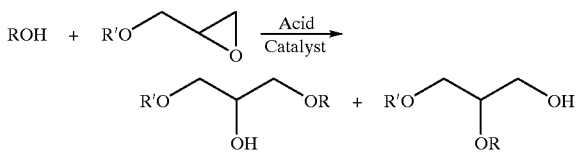

Since this process can occur at both ends of a difunctional resin, it should be clear that even with small degrees of reaction a highly branched material will be formed, which will quickly reach the gel point and yield a crosslinked, intractable material. Thus, acid catalyzed polymerizations are very useful for forming highly crosslinked final products like coatings and composites. However, the acid catalyzed polymerization of a difunctional or higher functional epoxy resin is inherently a difficult process to control, and acid catalyzed polymerizations are not broadly employed to produce higher molecular weight but still tractable products that can then be formulated and crosslinked with another resin such as an amine hardener or a melamine-formaldehyde resin to form a final product.

Due to increasing concerns about the negative effects of organic solvents on the environment and human health, there is a need in many industries, including the paint and coatings industry, for products with reduced levels of volatile organic content (VOC). There are many approaches to reducing VOC in the coatings industry, but certainly one of the most important is to utilize waterborne (WB) coatings, where the organic solvents which had formerly been used to reduce the viscosity of the paint formulation to the point necessary for application are replaced wholly or in part with water. Of course, since water is not a solvent for most paint binders, switching to a WB formulation usually requires chemical modification of the binder resins, or changing the form of the binder by emulsifying it, or a combination of these techniques.

There are many ways in which epoxy resins have been emulsified or dispersed to make waterborne coatings, and the technology has recently been reviewed (F. H. Walker and M. I. Cook, "Two-Component Waterborne Epoxy Coatings", in J. E. Glass (ed.), *Technology for Waterborne Coatings*, American Chemical Society: Washington, D.C., 1997, pp. 71–93). In general, special processes and specially designed surfactants must be employed to emulsify a high molecular weight epoxy resin such as a bisphenol-A type resin due to the high viscosity of the resin.

For example, U.S. Pat. No. 4,415,682 describes the $BF_3$ catalyzed reaction of a polyethylene glycol with liquid epoxy resin to form a block copolymer. The block copolymer is then used to emulsify a solution of a solid epoxy resin. However, to develop low VOC coatings from these epoxy resin dispersions, the solvent must be subsequently removed.

U.S. Pat. No. 4,315,044 describes reacting diglycidyl ethers of poly(ethylene oxide-co-propylene oxide), bisphenol-A, and liquid epoxy resin to prepare a surfactant in situ during the high temperature epoxy advancement process, and then dispersing the resin by adding a mixture of glycol ether solvent and water with vigorous agitation. As in the above system, substantial amounts of organic solvent are required in this process.

U.S. Pat. No. 4,608,406 modifies this process by incorporation of a novolac resin to increase the functionality of the dispersion.

The free radical process for polymerization of aqueous emulsions of unsaturated monomers, the so-called emulsion polymerization process, is widely practiced. There exist only a few references to the preparation of polysiloxanes, and hydrophobic polyesters and polyketals, by the acid catalyzed step-growth polymerization of emulsified monomers.

GB 2,303,857 describes the polymerization of emulsions of octamethylcyclo-tetrasiloxane with sulfonate surfactants.

Y. Yang and coworkers likewise studied the polymerization of emulsions of octamethylcyclotetrasiloxane (Hecheng Xiangjiao Gongye, 8(2), 100–4, 1985; Hecheng Xiangjiao Gongye, 8(1), 15–18, 1985; Gaofenzi Tongxun (2), 104–9, 1983; Gaofenzi Tongxun (4), 310–13, 1982; Gaofenzi Tongxun (4), 266–70, 1982). D. R. Weyenberg et. al. (Polym Prepr., Am. Chem. Soc., Div. Polym. Chem., 7(2), 562–8, 1966) also report the polymerization of emulsions of permethylcyclosiloxanes. One could speculate that since the equilibrium concentration of water in emulsions of polysiloxanes is very low, that polymerizations to form polysiloxanes, which are step-growth equilibrium processes involving addition and loss of water, would be ideal candidates for such a polymerization process.

U.S. Pat. No. 4,355,154 describes a method for polymerizing emulsions of hydrophobic polyacids and polyols to make polyesters using traditional polycondensation catalysts. U.S. Pat. No. 4,374,953 describe a process for making polyacetals and polyketals from emulsions of polyols and carbonyl compounds using traditional polycondensation catalysts. These are also equilibrium, or reversible, processes, requiring relatively hydrophobic monomers in order to achieve a useful degree of polymerization.

There appear to be no examples in the chemical literature of the cationic (i.e., acid catalyzed), non-reversible, or non-equilibrium, polymerization of monomers emulsified in an aqueous media, such as ring-opening polymerization of cyclic ethers. This may be because cationic polymerizations of this type are in general known to be quite subject to rapid termination reactions by trace impurities such as water. Thus, in aqueous emulsion systems, the equilibrium concentration of water in the organic phase is usually fairly high, on the order of tenths of a percent to several percent, and hence it would be anticipated that polymerization would be difficult.

U.S. Pat. No. 5,766,768 discloses two component water-based compositions prepared by reacting enhanced molecular weight epoxy emulsions with amine curatives, the enhanced molecular weight epoxy emulsions being prepared by polymerizing water-borne epoxy resin particles in the presence of an alkaline substance.

SUMMARY OF THE INVENTION

The present invention provides a method for making aqueous emulsions of polymeric materials by a non-reversible polymerization process. The method comprises dispersing a hydrophobic monomer in water in the presence of a surfactant to form an oil-in-water emulsion of dispersed hydrophobic monomer particles and non-reversibly polymerizing the water-borne monomer particles in the presence of an acid substance.

A preferred embodiment of the invention provides a method which comprises dispersing a hydrophobic cyclic ether monomer in water in the presence of a surfactant to form an oil-in-water emulsion of the dispersed hydrophobic monomer particles and non-reversibly polymerizing the water-borne monomer particles in the presence of an acid substance. Where a single monomer species is used the result is a homopolymer while the use of two or more monomers affords a co-polymer; hence, the polymerization process may be a homopolymerization or a copolymerization.

An especially preferred embodiment of the invention provides a method for producing aqueous emulsions of polymeric polyols from epoxy resins. The method comprises dispersing a liquid epoxy resin in water with the aid of a surfactant to form an oil-in-water emulsion of epoxy resin particles and polymerizing the water-borne epoxy resin particles in the presence of a superacid material.

Thus, in an embodiment of the invention, aqueous emulsions of multifunctional epoxide compounds are treated with certain acid catalysts to produce emulsions of higher molecular weight products that also have a much higher content of hydroxyl groups than the starting epoxy compound. Accordingly, a feature of this invention is an aqueous emulsion of polymerized epoxy resins containing hydroxyl groups, and optionally epoxide groups, where the polymerization has been achieved by treatment of an emulsion of lower molecular weight epoxy resins with an acid catalyst.

A further embodiment provides compositions of thermosetting coatings based on these emulsions of polymeric polyols, e.g., acid-polymerized epoxy resins. The emulsified polymeric polyols, especially the polymerized epoxy resins, can be formulated in aqueous media and crosslinked with suitable OH-group reactive crosslinking agents, including amino resins such as melamine formaldehyde resins, to yield highly crosslinked films exhibiting good hardness and solvent resistance at relatively low bake temperatures.

DETAILED DESCRIPTION OF THE INVENTION

The method for making aqueous emulsions of polymeric materials by a non-reversible, or non-equilibrium, polymerization process comprises dispersing a hydrophobic monomer in water in the presence of a surfactant to form an oil-in-water emulsion of the hydrophobic monomer particles and (homo)polymerizing the water-borne monomer particles in the presence of an acid substance. "An example of a non-reversible, or non-equilibrium, polymerization process is the acidic ring-opening polymerization of hydrophobic cyclic ethers." By "hydrophobic" material is meant an organic material that forms two phases when combined with water, wherein the equilibrium concentration of water in the organic phase is less than 20% by weight. By "non-reversible" reaction is meant a reaction that proceeds from starting material(s) to product(s) without a nontrivial concurrent reaction of product(s) to starting material(s). Those skilled in the art will recognize that such reactions have a large difference in free energy between reactant(s) and product(s), and hence a large equilibrium constant for the reaction.

The cyclic ethers useful in this invention for polymerization by the ring opening mechanism comprise ethers in which the ether functionality is part of a 3-member or larger ring, most especially a 3-, 4-, or 5-member ring including tetrahydrofuran moiety-containing compounds and mono- and/or multifunctional epoxies. Contemplated as the functional equivalent of the cyclic ethers useful for this invention are hydrophobic compounds containing an aziridine ring. Illustrative of ring opening polymerization of cyclic ethers is the following description of the aqueous emulsion non-reversible polymerization of epoxy resins.

The method for preparing a polymeric polyol emulsion from epoxy resins comprises dispersing a liquid epoxy resin, preferably a multifunctional epoxy resin, in water with the aid of a surfactant to form an emulsion of epoxy resin particles in water and reacting the water-borne epoxy resin particles in the presence of an acid, preferably a superacid material, to form a polymer comprising (homo)polymerized epoxy resin units. Using a single epoxy compound results in formation of a homopolymer and a mixture of two or more epoxy compounds affords a copolymer. For the purposes of this invention useful epoxy functionalities range from about 1 to about 4. Such epoxides are described in Y. Tanaka, "Synthesis and Characteristics of Epoxides", in C. A. May, ed., *Epoxy Resins Chemistry and Technology* (Marcel Dekker, 1988).

The monofunctional epoxide compounds useful in this invention comprise those compounds containing one 1,2-oxirane groups per molecule, which can be successfully emulsified, and which do not contain basic functional groups that would destroy the catalytic activity of the acid catalysts or functional groups that are reactive under the strongly acidic conditions used in the process of this invention. Examples include phenyl glycidyl ether, cresyl glycidyl ether, and glycidyl ethers of alcohols such as dodecyl alcohol.

The multifunctional epoxide compounds useful in this invention comprise those compounds containing about 2 or more 1,2-oxirane groups per molecule, which can be successfully emulsified, and which do not contain basic functional groups that would destroy the catalytic activity of the acid catalysts or functional groups that are reactive under strongly acidic conditions used in the process of this invention. Examples include epoxides of polyunsaturated organic compounds, oligomers of epihalohydrins, glycidyl derivatives of hydantoin and hydantoin derivatives, glycidyl ethers of polyvalent alcohols, glycidyl derivatives of triazines, and glycidyl ethers of polyhydric phenols.

Glycidyl ethers of polyhydric phenols include the glycidyl ethers of dihydric phenols, including resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (more commonly known as bisphenol A), and bis-(4-hydroxyphenyl)-methane (more commonly known as bisphenol F, and which may contain varying amounts of 2-hydroxyphenyl isomers), and the like.

Another useful class of epoxy resins are the cycloaliphatic epoxy resins, which are manufactured by Union Carbide Corporation. These are multifunctional epoxide compounds made by oxidizing cyclohexene containing compounds to add oxygen across the double bond. Useful cycloaliphatic epoxy resins include ERL-4221, ERL-4299, and ERL-4206.

Also useful in this invention are the epoxy novolac resins, which are the glycidyl ethers of novolac resins.

The preferred polyepoxy compounds are the diglycidyl ethers of bisphenol-A, the advanced diglycidyl ethers of bisphenol-A, the diglycidyl ethers of bisphenol-F, and the epoxy novolac resins. The most preferred polyepoxy compounds are the diglycidyl ethers of bisphenol-A.

In order to prepare a stable emulsion or dispersion of the cyclic ether monomer, a surfactant (i.e., an emulsifying agent) or mixture of surfactants must be employed unless a portion of the monomer has built into it structural units such as polyethylene oxide units that make it self-emulsifying. There are many surfactants commercially available that are of potential use in this invention. A good source for finding such surfactants is McCutcheon's Vol. 1: Emulsifiers & Detergents, published annually by McCutcheon's Division, MC Publishing Co., 175 Rock Rd., Glen Rock, N.J. 07452. The requirements for surfactants for this invention include that they yield an emulsion with the required stability for the application, that they maintain stability under the low pH conditions of the polymerization reaction, and that they not contain functional groups that interfere with the catalytic activity of the acid catalyst.

A useful class of surfactants are the nonionic surfactants. Nonionic surfactants are amphiphilic molecules that contain both a hydrophilic (water soluble) portion and a hydrophobic portion. Particularly useful surfactants are nonionic surfactants where the hydrophilic portion is a polyethylene oxide chain which is attached to a hydrophobe which is either an aromatic or aliphatic moiety, including alkylphenol ethoxylates, linear and branched alcohol ethoxylates, castor oil ethoxylates, and the like. Polyethylene oxide-polypropylene oxide (EO/PO) block copolymers are another useful class of surfactants.

It will be appreciated by one skilled in the art that finding a suitable emulsifier to yield a stable emulsion or dispersion of a given epoxide is to a large extent a matter of trial and error. A useful concept that can aid one in choosing a surfactant is the HLB, or hydrophile-lipophile balance of the surfactant. For a nonionic surfactant, the HLB is:

$$HLB = \frac{E}{5}$$

where E is equal to the weight percent of hydrophile in the surfactant. In the case of simple polyethylene oxide based surfactants, E is equal to the weight percent of polyethylene oxide. More information regarding both the HLB concept, the selection of surfactants, and the preparation of emulsions can be found in M. J. Schick, *Nonionic Surfactants Physical Chemistry*, Marcel Dekker: New York, 1987.

It is usually found that in general, in order to form a stable oil-in-water emulsion, a surfactant with a relatively high HLB value is required. Furthermore, it is often found that surfactants within a fairly narrow range of HLB values tend to work best to emulsify a certain compound. For example, the inventors have found that to emulsify Epon 828 bisphenol-A epoxy resin (epoxide equivalent weight of 188 to 195) in water, nonionic surfactants with an HLB of approximately 18 are suitable. This is not to say that some surfactant with an HLB value significantly different from 18 will not work, but rather to give a starting point for the trial and error process of finding a good surfactant for the specific application at hand. A particularly preferred surfactant is Hydropalat 65 surfactant from Henkel Corporation.

Alternatively and preferably, certain commercially available emulsions of epoxy resins may be used in this invention which avoids the necessity of preparing the epoxy resin emulsions. A preferred example of such a commercially available epoxy resin emulsion is Epi-Rez 3510 resin from Shell Chemical Co.

In order to polymerize the emulsified multifunctional epoxide compound, an acid catalyst of sufficient acid strength to yield the desired technical effect is required. The acid strength required will depend on the nature of the multifunctional epoxide starting material. For example, it is known that the cycloaliphatic epoxides described above are much more reactive with acid catalysts than are the glycidyl ethers of dihydric phenols, such as the diglycidyl ether of bisphenol-A. Another requirement of the acid catalyst is that it be stable in the aqueous medium for sufficient time to give the desired technical effect, or that the products of the reaction of the acid with water are themselves acids of sufficient strength to achieve the desired technical effect.

The acid materials or substances used in the polymerization process are any of those water soluble acids having a pKa of $\leq 2$, preferably $\leq 1$, especially a superacid. Suitable acids for the non-equilibrium emulsion polymerization are discussed below in the context of aqueous emulsion polymerization of epoxy resins.

Depending on hydrophobic monomer and especially the structure of the mono- or multifunctional epoxide compound, suitable acids include mineral acids, organic sulfonic acids, esters of sulfuric acid and superacids. Mineral acids include sulfuric acid, hydrochloric acid, perchloric acid, nitric acid, phosphoric acid, and the like. Organic sulfonic acids include both aromatic and aliphatic sulfonic acids. Representative sulfonic acids that are commercially available include methanesulfonic, trifluoromethanesulfonic, benzenesulfonic, dodecylbenzenesulfonic, dodecyl diphenyl oxide sulfonic, 5-methyl-1-naphthylenesulfonic, and p-toluenesulfonic acid, sulfonated polystyrene, and the sulfonates derived from polytetrafluoroethylenes.

Superacids are a particularly useful class of acid for the purposes of this invention and are defined as acidic substances that are stronger in acidity than 100% sulfuric acid. They are described in G. A. Olah, G. K. S. Prakash, and J. Sommer, *Superacids*, John Wiley & Sons: New York, 1985. Useful superacids include perchloric, fluorosulfuric, trifluoromethanesulfonic, and perfluoroalkylsulfonic acids. They also include Lewis superacids such as $SbF_5$, $TaF_5$, $NbF_5$, $PF_5$, and $BF_3$. Superacids also include hydrogen fluoride in combination with fluorinated Lewis acids such as $SbF_5$, $TaF_5$, $NbF_5$, $PF_5$, and $BF_3$. They also include oxygenated Bronsted acids such as sulfuric, fluorosulfuric, trifluoromethanesulfonic, and perfluoroalkylsulfonic acid in combination with Lewis acids such as $SbF_5$, $TaF_5$, $NbF_5$, $PF_5$, and $BF_3$. Obviously, it is preferred to use those superacids that are stable in water under the reaction conditions.

Particularly useful superacids for this process in general, and for the polymerization of diglycidyl ethers of dihydric phenols in particular, include perchloric, trifluoromethanesulfonic perfluoroalkylsulfonic, tetrafluoroboric, and hexafluoro-phosphoric acid ($HPF_6$). Other mineral acids such as sulfuric and hydrochloric acid, and organic sulfonic acids such as p-toluenesulfonic and methanesulfonic acid, were found not to be effective catalysts for the polymerization of the diglycidyl ether of bisphenol-A.

The fact that superacids are effective catalysts in an aqueous medium for the emulsion polymerization of diglycidyl ethers of dihydric phenols whereas other strong mineral and sulfonic acids are not effective is of itself a surprising result. It is well known that in an aqueous solution, the strength of any acid is limited by the basicity of water. Thus the strongest acid possible in aqueous solution is the complex of a proton and a water molecule or molecules, generally denoted in the chem Thus, all strong acids are essentially the same acid strength in aqueous solution, and the whole concept of having a superacid in an aqueous medium would be thought to be impossible on this basis.

While not wishing to be bound by theory, it is the inventor's hypothesis that the reason the technical effect is achieved in the present invention is that the superacid has some equilibrium concentration in the disperse, organic monomer phase. In this phase, the concentration of water is relatively low. Thus, within the disperse phase it is possible to achieve higher acid strengths than are possible in the aqueous continuous phase, and polymerization is achieved.

The aqueous emulsion of liquid epoxy resin particles may comprise 10 to 90 wt %, preferably 30 to 70 wt %, epoxy resin based on total emulsion weight and 1 to 20, preferably 3 to 10 wt %, surfactant based on epoxy resin.

In general, it is advantageous to use as high a wt % epoxy resin as possible to obtain maximum efficiency of reactor utilization. However, when the solids become too high, problems such as very high viscosity or emulsion instability arise. Likewise, surfactant concentration should normally be the minimum required to yield an emulsion stable to storage conditions and to the conditions of the polymerization, as this will reduce cost and minimize water-sensitivity in end-use applications.

An effective amount of superacid for polymerizing the dispersed epoxy resin particles is added to the aqueous medium. Such effective amount may range from 0.01 to 10 wt %, preferably 0.1 to 3 wt %, superacid based on total weight of the emulsion.

The polymerization reaction may be performed at 0 to 100° C., preferably 10 to 60° C., and any pressure, preferably atmospheric.

After a suitable degree of polymerization has occurred, the reaction is stopped by neutralizing the aqueous medium by the addition of a basic substance such as an aqueous solution of an alkali or alkaline metal hydroxide or an amine such as triethylamine.

Bisphenol-A derived epoxy resins are essentially linear polymers represented generically by the following chemical structure:

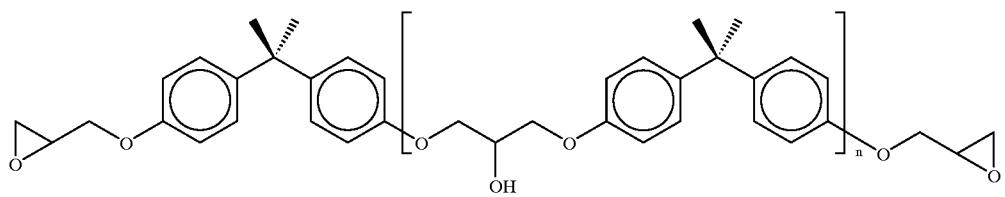

where n represents the average number of repeat units in the polymer.

In contrast, the structure of the polymer derived from this process when diglycidyl ether of bisphenol-A (DGEBA) is the starting material is significantly different from the structure of typical advanced epoxy resins shown above, and also different from the structure of epoxy resins prepared by cationic polymerization of epoxy resins as reported by Tanaka and Bauer in C. A. May (Ed.), 'Epoxy Resins Chemistry and Technology', Marcel Dekker, Inc.: New York, 1988, pp. 337–343. Based on a combination of $^{13}$C NMR and matrix assisted laser desorption/ionization (MALD/I) mass spectrometry, it is believed that the polymer has the following structure:

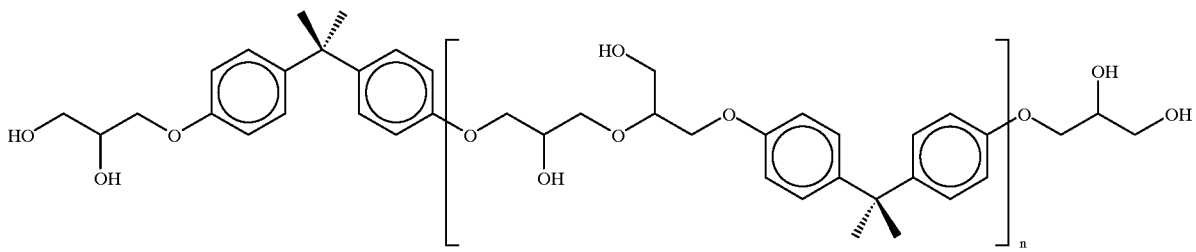

where two glycidyl units joined by an ether linkage are present between aromatic ring units in the repeat unit structure, and where the resulting hydroxyl groups in the repeat unit can either be secondary or primary or a combination of secondary and primary (only the latter is shown above). In the above structure, "n" can range from 1 to 100. The NMR spectrum also clearly indicates the presence of branching units, where additional repeat units form by etherification of hydroxy groups in the repeat unit structure. In addition, all or nearly all of the epoxide end groups are hydrolyzed when the reaction is taken to a high degree of conversion, resulting in the presence of glycol end groups.

While not wishing to be bound by theory, it is believed that the chemical structure results from a polymerization mechanism where the reaction begins by first hydrolyzing an epoxide by addition of water to a protonated epoxide. This is followed by addition of the glycol to a protonated epoxide, to yield the repeat unit structure as shown.

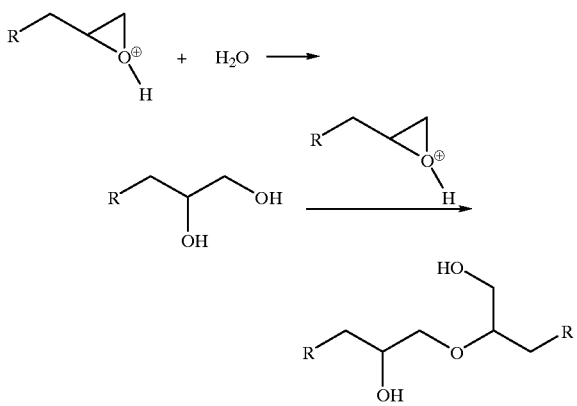

The polymers prepared by the process of this invention can be crosslinked using crosslinking agents that react with hydroxyl groups. Many such crosslinking agents are known and of industrial importance. Such crosslinking agents include the so-called amino resins which include melamine-formaldehyde resins, urea-formaldehyde resins, benzoguanamine-formaldehyde resins, glycoluryl-formaldehyde resins, as well as the etherified derivatives of these resins. They are described in Z. W. Wicks, F. N. Jones, and S. P. Pappas, *Organic Coatings Science and Technology*, 2$^{nd}$ Ed., Wiley-Interscience, New York, 1999, pp. 162–179. Another useful class of crosslinkers that react with OH groups are the multifunctional isocyanates. They are described in Z. W. Wicks, F. N. Jones, and S. P. Pappas, *Organic Coatings Science and Technology*, 2$^{nd}$ Ed., Wiley-Interscience, New York, 1999, pp. 180–207.

When employing amino resin crosslinkers it is frequently found necessary to include an acid catalyst in the coating formulation. Depending on the type of amino resin employed, this may be a strong acid catalyst such as a sulfonic acid, or a weaker acid such as a carboxylic acid. For example, fully alkylated melamine-formaldehyde resins such as hexamethoxymethyl melamine-formaldehyde resin (HMMM) usually require a strong acid catalyst, whereas high imino, partially alkylated resins respond well to weak acid catalysis. If long term storage in a one component formulation is required, it is common to block the acid catalyst with a volatile amine, and many blocked acid catalysts are commercially available. In addition, one component formulations often contain volatile alcohols such as methanol, ethanol, butanol, glycol ethers and the like which improve the stability of the formulation.

Amino resins and polyols are not usually formulated on the basis of stoichiometry, but rather on a weight basis. In part this is due to the fact that many amino resin crosslinkers self condense at rates comparable to the transetherification reaction with polyols, and also due to the fact that many amino resins have a very high functionality and all of the reactive groups need not react in order to achieve useful properties. However, the exact properties that one obtains are a function of the ratio of amino resin to polyol, and the best formulation for a given application is normally found by running a number of experiments varying this ratio. The ratio of the weight of epoxy polymer solids of the current invention to amino resin crosslinker solids that yields useful properties can vary from about 95:5 to 50:50, and preferably from about 90:10 to 60:40.

The time and temperature of cure for an amino resin can vary considerably depending upon the nature of the formulation, the catalyst level, the blocking agent for the catalyst if one is present, and the exact properties desired. Catalyst levels can vary from about 0.05% based on total resin solids to about 10%. Cure temperature can vary from ambient temperature (about 20° C.) to about 300° C., and cure times can vary from several hours to just a few seconds. For example, combinations of high catalyst level, low cure temperature and long cure time might be employed for a substrate that cannot tolerate high temperatures such as wood paneling. A coil coating, in contrast, may be cured for only a few seconds at a very high temperature using a more modest level of catalyst.

Isocyanates useful in curing the polymers of the current invention include both aromatic and aliphatic isocyanates. Useful aromatic isocyanates include any of the commercially available aromatic isocyanates such as toluene diisocyanate (TDI), diphenylmethane-4,4'-diisocyanate (MDI), and aromatic isocyanates derived from oligomers of the reaction of formaldehyde and aniline. Aliphatic isocyanates include any of the commercially available aliphatic isocyanates such as isophorone diisocyanate (IPDI), hexamethylene diisocyanate (HMDI), trimethylhexamethylene diisocyanate, bis-(4-isocyanatocyclohexyl)methyl diisocyanate ($H_{12}$MDI), tetramethylxylylene diisocyanate (TMXDI), and polymeric isocyanates prepare by the polymerization of m-isopropenyl-a,a-dimethylbenzyl isocyanate (m-TMI). In addition, derivatives of the aliphatic and aromatic diisocyanates such as their isocyanurate trimers, biurets, and adducts with polyols such as trimethylolpropane are also useful crosslinkers for the current invention as are isocyanates modified with hydrophilic moieties which render them water dispersible, such as Bahyclur XP-7063 from Bayer Corp.

The isocyanates may be used without modification, in which case the formulation will most likely be two component, with a pot life ranging from fractions of an hour to a day or so, where the isocyanate and polyol are stored in separate containers and mixed prior to use. Cure temperatures for these systems generally range from ambient temperatures to moderate baking temperatures of 120° C. The reactions are usually catalyzed with tin, bismuth, zirconium and other metal salt catalysts, or by tertiary amines, or by combinations of metals and amines. The isocyanates may on the other hand be reacted with a blocking agent that is released to reform the isocyanate under baking conditions, which can then go on to react with the polyol of the current invention. Useful blocking agents include volatile alcohols, phenols, ketoximes, and b-keto-esters, and are well known to those skilled in the art. Catalysts similar to those employed in the two component formulations are also employed in the one component formulations. Relatively high bake temperatures ranging from about 90° C. to 300° C. are employed, depending again on catalyst concentration and cure time requirements.

Coatings prepared from the resins of the current invention and crosslinkers can be formulated with a wide variety of ingredients well known to those skilled in the art of coating formulation, including solvents, fillers, pigments, pigment dispersing agents, rheology modifiers, thixotropes, flow and leveling aids, defoamers, etc.

Coatings of this invention can be applied by any number of techniques including spray, brush, roller, doctor blade, and the like that are known in the coating art. They may also be applied using specialized industrial equipment such as that employed in coil coatings. Numerous substrates are suitable for application of coatings of this invention with proper surface preparation, as is well understood in the art. Such substrates include but are not limited to many types of metal, particularly steel and aluminum, as well as wood and various plastics.

EXAMPLE 1

Preparation of Epoxy Resin Emulsion

In a stainless steel mixing bowl was placed 109 g of deionized (DI) water and 77 g of Hydropalat® 65 surfactant (a 65% solids solution of a nonionic emulsifier from Henkel Corp.). The mixture was placed in a Hobart mixer fitted with a slotted paddle and mixed for 3 min. The mixer was turned off, 350 g of Araldite® 6010 bisphenol-A type liquid epoxy resin (EEW 190, Ciba-Geigy Corp.) was added, and the mixture was mixed for 5 min at speed 1 and another 5 min at speed 2. An additional 300 g of Araldite 6010 resin was added and mixed 5 min at speed 1 and 5 min at speed 2. An additional 300 g of Araldite 6010 resin was added and mixed 5 min at speed 1 and 60 min at speed 2. While continuing to mix, the mixture was then slowly let down with 530.7 g of DI water and mixed for an additional hour. The final product had a mean volume averaged particle size of 619 nm and a theoretical solids content of 60%.

EXAMPLE 2

Procedure for Measuring Extent of Reaction by IR Spectroscopy.

A few drops of emulsion were placed on an out-of-compartment attenuated total reflectance 45° Zn-Se flat cell, available from Spectra-tech, Inc., Shelton, Conn. The emulsion was smeared across the cell surface using a soft cotton pad. Water was allowed to evaporate from the resulting thin film, during which time the film changed in appearance from milky white to clear. Typically this process took about 1 min. The IR spectrum (32 scans) was then obtained in absorption mode, and then processed to obtain the $2^{nd}$ derivative of the spectrum. The height of the gem-dimethyl absorbances at 1383 and 1362 $cm^{-1}$ were then measured, and divided into the height of the epoxy ring absorbance at 916 $cm^{-1}$. This yields a normalized absorbance for the epoxide, since the gem-dimethyl group is inert toward the reaction conditions. To estimate the extent of reaction as a function of time, the normalized epoxy absorbance at time t was divided by the normalized absorbance at t=0.

EXAMPLE 3

Polymerization of Liquid Epoxy Resin Catalyzed by Perchloric Acid

Into a glass jar was placed 200 g of the emulsion of Example 1, followed by 20.0 g of 10% perchloric acid in DI water. The mixture was shaken for 1 min, and then an IR spectrum was run according to the procedure of Example 2 to establish the epoxide content at t=0. After 27 hours of reaction at room temperature, the reaction was quenched with 6.99 g of 10% NaOH solution, which resulted in a pH of 7.0 for the solution. Analysis of the 916 $cm^{-1}$ band normalized to the 1362 $cm^{-1}$ band indicated only 7% of the epoxide remained at this time. A film of this material draw down on a steel panel also dried tack free to a light touch in about 10 minutes (i.e., after water evaporation), whereas a film of the starting emulsion similarly drawn down remained tacky indefinitely. The %solids of the product (1 hour, 110° C.) was 59.6%.

EXAMPLES 4–10

Evaluation of Acid Catalysts

As in Example 3, emulsions of Example 1 were treated with 1% acid catalyst based on total weight of emulsion. The acid catalysts were all added as 10% solutions in water. Epoxide conversion was measured after 24 hours using the procedure of Example 2. Number average (Mn) and weight average (Mw) molecular weights were determined using GPC after quenching the samples at the times indicated in Table 1.

TABLE 1

| Catalyst | Extent of Reaction in 24 Hours | Mn | Mw | Reaction Time (Hr) |
| --- | --- | --- | --- | --- |
| None | — | 360 | 565 | |
| p-$CH_3C_6H_4SO_3H$ | 2.8% | 383 | 523 | 72 |
| $CH_3SO_3H$ | 0% | 370 | 500 | 72 |
| $HBF_4$ | 37.0% | 1650 | 6600 | 72 |
| $HPF_6$ | 95.3% | 1850 | 12,600 | 72 |
| $CF_3SO_3H$ | 25.3% | 1590 | 6150 | 72 |
| $HClO_4$ | 91.8% | 1755 | 8250 | 24 |

These results indicate that $HClO_4$, $HPF_6$, $HBF_4$, and $CF_3SO_3H$ are all effective catalysts for this polymerization reaction, whereas p-toluenesulfonic acid and methanesulfonic acid are not. In separate experiments it was also found that sulfuric acid and hydrochloric acid under similar conditions are also ineffective catalysts. These results support the hypothesis that very strong acids (superacids) are required to yield effective polymerization of DGEBA. Note also that although the molecular weight for the epoxy polymer catalyzed by $HPF_6$ was measured at 72 hours, epoxy conversion was nearly complete in 24 hours, and it may have built molecular weight as fast or faster than perchloric acid.

EXAMPLE 11
Coating Formulation Cured with Melamine-formaldehyde Resin

In a glass jar was placed 26.85 g of the resin of Example 3, 4.0 g of Resimene® 747 HMMM type M-F resin (Solutia, Inc.), 2.35 g of DI water, and 0.6 g of a 10% solution of p-toluenesulfonic acid in DI water. On a solid weight basis, this represents an 80:20 ratio of polymerized epoxy resin to M-F resin. The same day the formulation was prepared films were applied to Bonderite 1000 steel panels (Q-Panel Co.) using a 2 mil wet film thickness drawdown bar. After a 15 minute flash at room temperature, the panels were baked for 30 minutes at temperatures starting at 90° C., and increasing in 10° C. increments. At 90° C., the coating had an F pencil hardness and showed visible attack with 10 MEK double rubs, though with 250 MEK double rubs the film was not completely removed from the rubbed area. With a 100° C. bake, the coating had a 0.9 mil dry film thickness, 4H pencil hardness and showed no effect from 250 MEK double rubs. It also had 5B cross-hatch adhesion, a 60° gloss of 90, 56 in-lb (65 cm-kg) direct impact, and 12 in-lb (14 cm-kg) reverse impact. Higher cure temperatures (up to 160° C.) gave comparable hardness and MEK double rub resistance.

EXAMPLE 12
Comparative Coating Formulation Based on a Commercially Available High Molecular Weight Epoxy Resin Dispersion in Water In a jar were mixed 29.09 g of Epi-Rez® 3540-WY-55 resin (Shell Chemical Co.), 4 g of Resimene® 747 resin, 9.31 g DI water, and 0.6 g 10% p-toluenesulfonic acid in DI water. According to the manufacturer, Epi-Rez® resin is a 55% solids dispersion of an Epon® 1007F resin (advanced bisphenol-A type epoxy resin) in a 76% water, 24% 2-propoxyethanol blend, with an EEW of 1800 based on solids. In order to apply this formulation to a substrate, the solids of this formulation were lower than the solids of Example 11 because of the much higher viscosity of the Epi-Rez® 3540 resin compared to the dispersion of Example 3. Films were applied and panels baked according to the procedure of Example 11, except that no cure temperatures lower than 110° C. were attempted. When cured at 110° C., a 2H hardness was obtained, but there was significant damage to the film with 10 MEK double rubs, and with 50 MEK double rubs the coating was completely removed from the substrate. When cured at 120° C., the film had a 3H hardness, and there was significant damage to the film with 10 MEK double rubs, though with 250 MEK double rubs the film was not completely removed from the rubbed area. When baked at 130° C., the film had a 3H pencil hardness, and showed almost no attack from 250 MEK double rubs, though the area on the film that had been rubbed could be discerned. The film thickness was 0.6 mil. It also had 5B cross-hatch adhesion, a 60° gloss of 119, >160 in-lb (>185 cm-kg) direct impact, and >160 in-lb (>185 cm-kg) reverse impact. Further increases in bake temperature (to 160° C.) gave hardness and solvent resistance comparable to that achieved at 130° C.

These results clearly indicate that the resin of Example 3 could be cured for 30 minutes at 100° C. to give a film with comparable hardness and solvent resistance to a WB epoxy resin dispersion of the current art cured for 30 minutes at 130° C.

EXAMPLE 13
Polymerization of Epi-Rez® 3510 Epoxy Resin Catalyzed by Perchloric Acid.

Into a glass jar was placed 100 g of Epi-Rez 3510 resin (Shell Chemical Co., a 60% solids emulsion of bisphenol-A epoxy resin stabilized by a proprietary surfactant). Then 10 g of a 10% solution of perchloric acid in water was added dropwise with stirring. An IR spectrum was immediately obtained according to the procedure of Example 2. After 89 hours at room temperature another IR spectrum indicated that only 6% of the epoxide remained at this time. Two 45.0 g samples were then poured off from this reaction mixture. The first was neutralized with 1.67 g of a 10% solution of sodium hydroxide in water. The other sample was quenched with 4.73 g of a 10% solution of triethylamine (TEA) in water. Coating formulations at an 80:20 ratio of polyol to melamine resin catalyzed with 0.3% p-toluenesulfonic acid on solids were prepared from these samples using the procedure of Example 11. The sample neutralized with sodium hydroxide yielded a coating that showed no damage with 250 MEK double rubs when baked at 110° C. for 30 min, but when baked at 100° C. for 30 min there was slight damage from 250 MEK double rubs. The sample neutralized with TEA yielded a coating that showed no damage with 250 MEK double rubs when baked at 90° C. for 30 min.

STATEMENT OF INDUSTRIAL APPLICATION

The invention provides a method for the preparation of aqueous emulsions of polymeric polyols from epoxy resins, suitable for use in aqueous coating compositions that can be cured at lower temperatures.

I claim:

1. A method for preparing an aqueous polymer emulsion which comprises dispersing a hydrophobic cyclic ether monomer in water in the presence of a surfactant to form dispersed cyclic ether monomer particles, non-reversibly polymerizing the water-borne monomer particles by ring opening in the presence of an effective amount of a water soluble acid material having a pKa of $\leq 2$ and stopping the polymerization after a suitable degree of polymerization has occurred by adding a basic substance.

2. The method of claim 1 in which the acid material is a mineral acid, an organic sulfonic acid, an ester of sulfuric acid or a superacid.

3. The method of claim 1 in which the acid material is sulfuric acid, hydrochloric acid, perchloric acid, nitric acid or phosphoric acid.

4. The method of claim 1 in which the acid material is methanesulfonic acid, trifluoromethanesulfonic acid, benzenesulfonic acid, dodecylbenzenesulfonic acid, dodecyl diphenyl oxide sulfonic acid, 5-methyl-1-naphthylenesulfonic acid, p-toluene-sulfonic acid, sulfonated polystyrene or a sulfonate derived from polytetrafluoroethylene.

5. The method of claim 1 in which the acid material is a superacid.

6. The method of claim 5 in which the superacid is perchloric acid; fluorosulfuric acid; trifluoromethanesulfonic acid; perifluoroalkylsulfonic acid; $SbF_5$, $TaF_5$; $NbF_5$; $PF_5$; $BF_3$; hydrogen fluoride in combination with $SbF_5$, $TaF_5$, $NbF_5$, $PF_5$, or $BF_3$; or sulfuric, fluorosulfuric, trifluoromethanesulfonic, or perfluoroalkylsulfonic acid in combination with $SbF_5$, $TaF_5$, $NbF_5$, $PF_5$, or $BF_3$.

7. A method for preparing an aqueous polymeric polyol emulsion which comprises dispersing a hydrophobic cyclic ether monomer in water in the presence of a surfactant to form dispersed monomer particles and non-reversibly polymerizing the water-borne cyclic ether monomer particles in the presence of an effective amount of a water soluble acid material having a pKa of $\leq 1$ and stopping the polymerization after a suitable degree of polymerization has occurred by adding a basic substance.

8. The method of claim 7 in which the acid material is a superacid.

9. The method of claim 8 in which the superacid is perchloric acid; fluorosulfuric acid; trifluoromethanesulfonic acid; perfluoroalkylsulfonic acid; $SbF_5$; $TaF_5$; $NbF_5$; $PF_5$; $BF_3$; hydrogen fluoride in combination with $SbF_5$, $TaF_5$, $NbF_5$, $PF_5$, or $BF_3$; or sulfuric, fluorosulfuric, trifluoromethanesulfonic, or perfluoroalkylsulfonic acid in combination with $SbF_5$, $TaF_5$, $NbF_5$, $PF_5$, or $BF_3$.

10. The method of claim 8 in which the cyclic ether is a monofunctional epoxy, a multifunctional epoxy, or a combination of both.

11. The method of claim 8 in which the cyclic ether is a diglycidyl ether of bisphenol-A, an advanced diglycidyl ether of bisphenol-A, a diglycidyl ether of bisphenol-F, or polyepoxy novolac resin.

12. The method of claim 9 in which the cyclic ether is a diglycidyl ether of bisphenol-A, an advanced diglycidyl ether of bisphenol-A, a diglycidyl ether of bisphenol-F, or polyepoxy novolac resin.

13. The method of claim 10 in which the superacid is perchloric acid; trifluoromethanesulfonic acid; hydrogen fluoride in combination with $PF_5$; or hydrogen fluoride in combination with $BF_3$.

14. The method of claim 11 in which the superacid is perchloric acid; trifluoromethanesulfonic acid; perfluoroalkylsulfonic acid; hydrogen fluoride in combination with $PF_5$; or hydrogen fluoride in combination with $BF_3$.

15. The method of claim 11 in which the superacid is perchloric acid.

16. The method of claim 15 in which the polyepoxide is a diglycidyl ether of bisphenol-A.

17. A method for preparing an aqueous polymeric polyol emulsion which comprises dispersing a hydrophobic polyepoxide in water in the presence of an effective amount of a surfactant to form dispersed polyepoxide particles and non-reversibly polymerizing the water-borne polyepoxide particles in the presence of a water soluble superacid and stopping the polymerization after a suitable degree of polymerization has occurred by adding a basic substance.

18. The method of claim 17 in which the superacid is perchloric acid; fluorosulfuric acid; trifluoroimethanesulfonic acid; perfluoroalkylsulfonic acid; $SbF_5$; $TaF_5$; $NbF_5$; $PF_5$; $BF_3$; hydrogen fluoride in combination with $SbF_5$, $TaF_5$, $NbF_5$, $PF_5$, or $BF_3$; or sulfuric, fluorosulfuric, trifluoromethanesulfonic, or perfluoroalkylsulfonic acid in combination with $SbF_5$, $TaF_5$, $NbF_5$, $PF_5$, or $BF_3$.

19. The method of claim 18 in which the polyepoxide is a polyepoxide of a polyunsaturated organic compound, an oligomer of an epihalohydrin, a polyglycidyl derivative of hydantoin or a hydantoin derivative, a polyglycidyl ether of a polyvalent alcohol, a polyglycidyl derivative of a triazine, a polyglycidyl ether of a polyhydric phenol or a polyepoxy novolac resin.

20. The method of claim 19 in which the polyepoxide is a diglycidyl ether of bisphenol-A, an advanced diglycidyl ether of bisphenol-A, a diglycidyl ether of bisphenol-F, or poly epoxy novolac resin.

21. The method of claim 17 in which the superacid is perchloric acid; trifluoromethanesulfonic acid; hydrogen fluoride in combination with $PF_5$; or hydrogen fluoride in combination with $BF_3$.

22. The method of claim 20 in which the superacid is perchloric acid; trifluoromethanesulfonic acid, hydrogen fluoride in combination with $PF_5$; or hydrogen fluoride in combination with $BF_3$.

23. A coating composition comprising the aqueous polymeric polyol emulsion of claim 7 and an OH-reactive crosslinking agent.

24. A coating composition comprising the aqueous polymer emulsion of claim 1 and an OH-reactive crosslinking agent.

25. A coating composition comprising the aqueous polymeric polyol emulsion of claim 17 and an OH-reactive crosslinking agent.

26. A coating composition comprising the aqueous polymeric polyol emulsion of claim 18 and an OH-reactive crosslinking agent.

27. A coating composition comprising the aqueous polymeric polyol emulsion of claim 19 and an OH-reactive crosslinking agent.

28. A coating composition comprising the aqueous polymeric polyol emulsion of claim 20 and an OH-reactive crosslinking agent.

29. A coating composition comprising the aqueous polymeric polyol emulsion of claim 21 and an OH-reactive crosslinking agent.

30. A coating composition comprising the aqueous polymeric polyol emulsion of claim 22 and an OH-reactive crosslinking agent.

31. The coating composition of claim 23 in which the basic substance is an alkali or alkaline metal hydroxide or an amine.

32. The coating composition of claim 24 in which the basic substance is an alkali or alkaline metal hydroxide or an amine.

33. The coating composition of claim 25 in which the basic substance is an alkali or alkaline metal hydroxide or an amine.

34. The method of claim 1 in which the basic substance is an alkali or alkaline metal hydroxide or an amine.

35. The method of claim 7 in which the basic substance is an alkali or alkaline metal hydroxide or an amine.

36. The method of claim 17 in which the basic substance is an alkali or alkaline metal hydroxide or an amine.

* * * * *

UNITED STATES PATENT AND TRADEMARK OFFICE
CERTIFICATE OF CORRECTION

PATENT NO. : 6,331,583 B1
DATED : December 18, 2001
INVENTOR(S) : Frederick Herbert Walker It is certified that error appears in the above-identified patent and that said Letters Patent is hereby corrected as shown below:

<u>Column 14,</u>
Line 63, delete "perifluoroalkylsulfonic" and substitute therefor -- perfluoroalkylsulfonic --

<u>Column 15,</u>
Line 15, delete "trifluoroimethanesulfonic" and substitute therefor -- trifluoromethanesulfonic --

Signed and Sealed this

Sixteenth Day of April, 2002

Attest:

JAMES E. ROGAN
*Director of the United States Patent and Trademark Office*

*Attesting Officer*